(12) United States Patent
Song et al.

(10) Patent No.: US 7,528,566 B2
(45) Date of Patent: May 5, 2009

(54) METHOD FOR CONTROLLING VOLTAGE OF DC LINK FOR ELECTRIC VEHICLE

(75) Inventors: Hong Seok Song, Seongnam-si (KR); Doo Yong Oh, Seoul (KR); Kwang Hee Nam, Pohang-si (KR); Sung Young Kim, Busan (KR)

(73) Assignees: Hyundai Motor Company, Seoul (KR); Pohang University of Science & Technology, Pohang-Si (KR)

( * ) Notice: Subject to any disclaimer, the term of this patent is extended or adjusted under 35 U.S.C. 154(b) by 340 days.

(21) Appl. No.: 11/300,161

(22) Filed: Dec. 13, 2005

(65) Prior Publication Data
US 2007/0296357 A1 Dec. 27, 2007

(30) Foreign Application Priority Data
Nov. 17, 1920 (KR) .............................. 2005-0110370

(51) Int. Cl.
H02P 6/08 (2006.01)
(52) U.S. Cl. .................... 318/632; 318/621; 318/700; 318/139
(58) Field of Classification Search ................ 318/461, 318/478, 153, 689, 799, 800, 801, 139, 621, 318/632, 700
See application file for complete search history.

(56) References Cited
U.S. PATENT DOCUMENTS
4,730,242 A * 3/1988 Divan ........................ 363/37
5,329,222 A * 7/1994 Gyugyi et al. .............. 323/207
6,028,406 A * 2/2000 Birk ...................... 318/400.04
2004/0145338 A1* 7/2004 Nakamura et al. .......... 318/801

FOREIGN PATENT DOCUMENTS

| JP | 2001-025291 | 1/2001 |
|----|-------------|--------|
| JP | 2002-051566 | 2/2002 |
| JP | 2002-051589 | 2/2002 |
| JP | 2003-061382 | 2/2003 |
| JP | 2004-187468 | 7/2004 |

* cited by examiner

Primary Examiner—Bentsu Ro
(74) Attorney, Agent, or Firm—Morgan, Lewis & Bockius LLP (57) ABSTRACT

Disclosed is a method for controlling a voltage of a DC link for an electric vehicle, which can reduce a capacitance of the DC link interposed between an inverter and a DC/DC converter.

The method for controlling the voltage of the DC link in a power system of a vehicle including a battery, a DC/DC converter, the DC link, an inverter, a motor, and a control part controlling the DC/DC converter and the inverter includes the steps of installing a compensator in a control loop of the control part such that a DC link current of the DC/DC converter follows a DC link current of the inverter, calculating a predetermined compensation term based on information of the motor inputted into the compensator, and applying the compensation term to a voltage node in the control loop of the control part in the compensator.

12 Claims, 5 Drawing Sheets

METHOD FOR CONTROLLING VOLTAGE OF DC LINK FOR ELECTRIC VEHICLE

CROSS-REFERENCE TO RELATED APPLICATION

This application claims priority to and the benefit of Korean Patent Application 10-2005-0110370 filed in the Korean Intellectual Property Office on Nov. 17, 2005, the entire content of which is incorporated herein by reference.

BACKGROUND OF THE INVENTION

1. Field of the Invention

The present invention relates to a method for controlling a voltage of a DC link for an electric vehicle, and more particularly to a method for controlling a voltage of a DC link for an electric vehicle, which can reduce a capacitance of the DC link interposed between an inverter and a DC/DC converter.

2. Description of the Related Art

A vehicle using a battery as a power source like an electric vehicle or a hybrid vehicle has a DC/DC converter for raising the battery voltage and an inverter for driving a motor. The DC/DC converter and the inverter have a DC link interposed therebetween, and the DC link has a mass storage capacitor for buffering a voltage and a current. Generally, the DC link employs a great mass storage capacitor for reducing a voltage fluctuation ratio between the DC/DC converter and the inverter. In other words, the DC link employs an electrolytic capacitor, or a film capacitor having large volume.

However, since such a capacitor of the DC link has a large-size and an inferior thermal characteristic, an electrolytic solution contained in the capacitor may be leaked from the capacitor in the form of gas or liquid when the capacitor is used for a long time or if heat is applied to the capacitor, thereby shortening the life span of the capacitor. In addition, since the inner space of a vehicle is extremely restricted, an effort to reduce the number of replaced capacitors or attached capacitors is being made.

Figure 1:
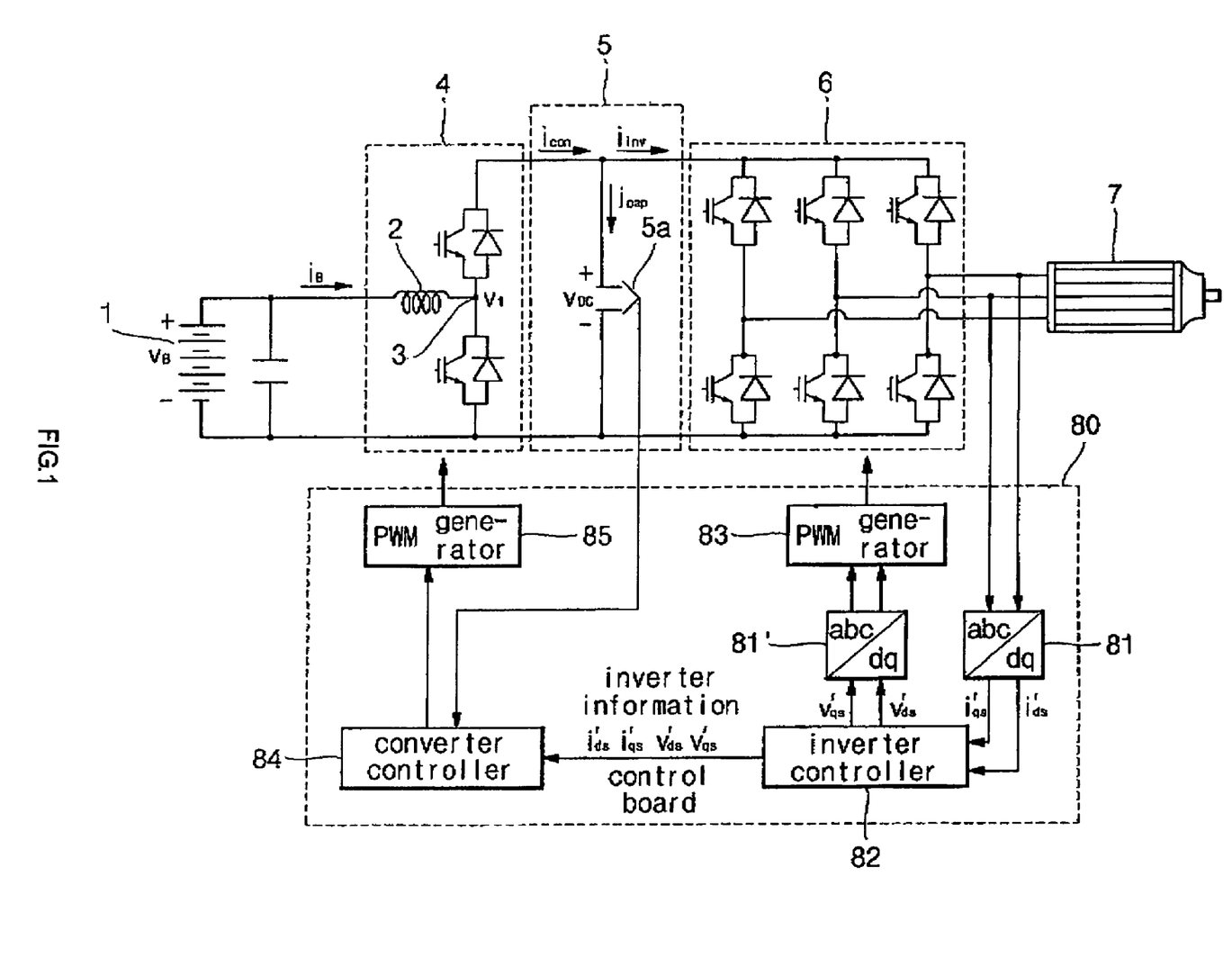
FIG. 1 is a circuit diagram schematically illustrating the conventional power system of an electric vehicle or a hybrid vehicle.

FIG. 1 schematically illustrates the conventional power system of the electric vehicle or the hybrid vehicle.

As shown in FIG. 1, conventionally, a power system of a vehicle employing electricity as a power source includes a battery 1, a DC/DC converter 4, a DC link 5, an inverter 6, a motor 7, and a control part 80.

The battery 1 is an energy source having a predetermined potential difference, the DC/DC converter 4 raises the voltage of the battery 1 to a predetermined voltage, the DC link 5 flattens the voltage raised by the DC/DC converter 4, the inverter 6 outputs an AC voltage having a predetermined voltage and a predetermined frequency to the motor 7, and the motor 7 rotates with a predetermined rotational frequency and a predetermined torque. In addition, the control part 80 controls the DC/DC converter 4 and the inverter 6 through a pulse width modulation scheme by performing feedback with respect to a current outputted from the inverter 6 and a voltage of the DC link 5. In FIG. 1, reference numerals 81 and 81' represent converters for converting a 3-phase current coordinate inputted to the motor 7 or the inverter 6 into a 2-phase current coordinate, and reference numerals 83 and 85 represent PWM generators, reference numeral 82 represents an inverter controller, and reference numeral 84 represents a converter controller.

In addition, although the DC/DC converter 4 may have various types, the present invention employs a Buck-Boost converter having a coil 2 and two switches as an example. The inverter 6 may include six switches. Herein, it is natural that the DC link 5 connecting the DC/DC converter 4 to the inverter 6 has at least one mass storage capacitor 5a installed on the DC link 5.

Figure 2:
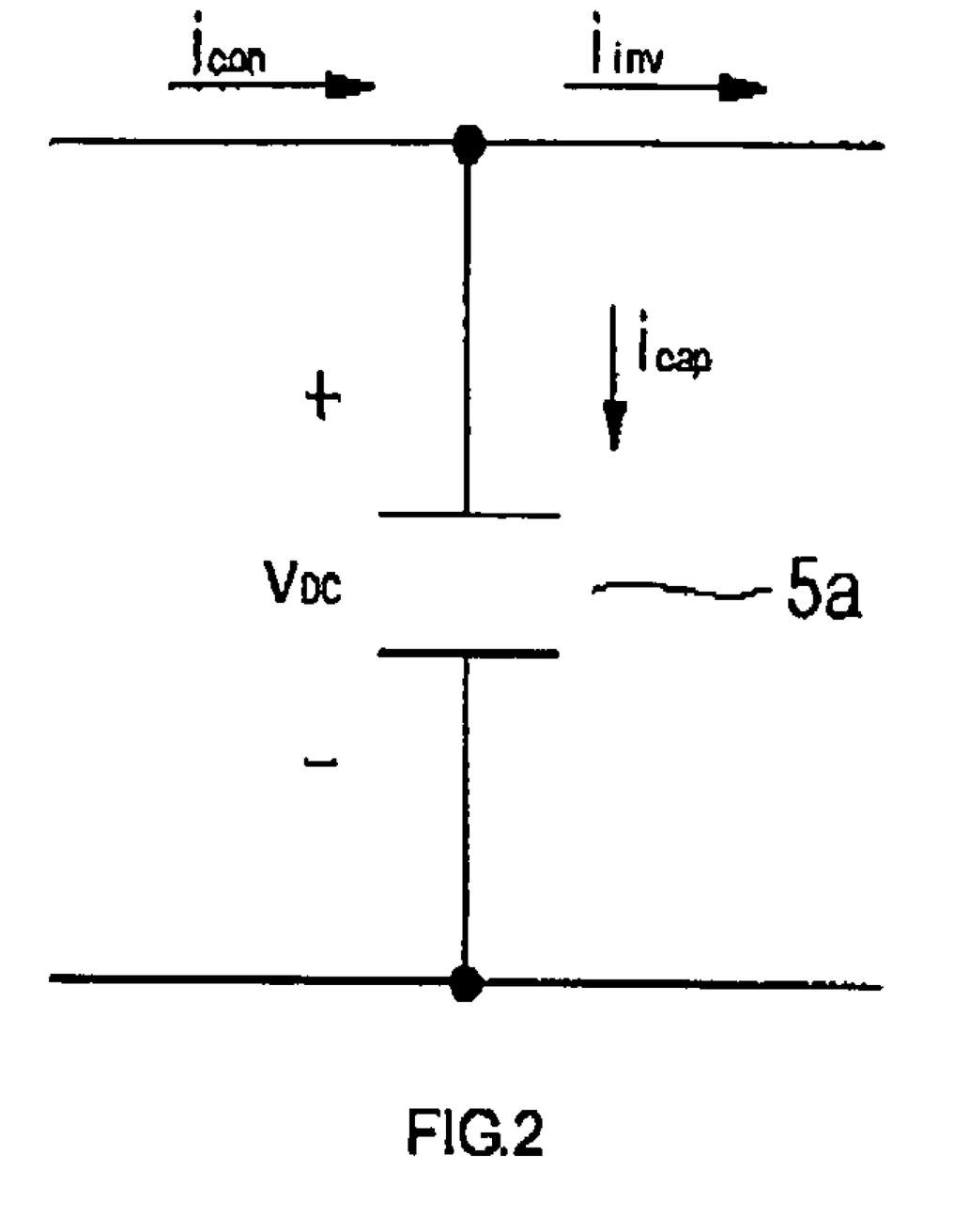
FIG. 2 is a circuit diagram illustrating currents flowing in a DC link.

FIG. 2 illustrates only the capacitor 5a of the DC link 5.

In FIG. 2, currents $i_{con}$, $i_{cap}$, and $i_{inv}$ represent a current flown from the DC/DC converter 4, a current flowing toward the capacitor 5a of the DC link 5, and a current flowing toward the inverter 6, respectively. In FIG. 1, if the current $i_{con}$ from the DC/DC converter 4 is equal to the current $i_{inv}$ toward the inverter 6, the current $i_{cap}$ toward the capacitor 5a of the DC link 5 becomes zero (0) through Kirchhoff's law. That is, if $i_{con}=i_{inv}$, $i_{cap}=0$. In other words, if $i_{cap}=0$, a voltage $V_{DC}$ of the DC link 5 is constantly maintained. Accordingly, if the current $i_{con}$ of the DC/DC converter 4 follows the current $i_{inv}$ when the motor 7 is accelerated, decelerated, or stopped, the capacity of the capacitor 5a in the DC link 5 may be minimized.

Figure 3:
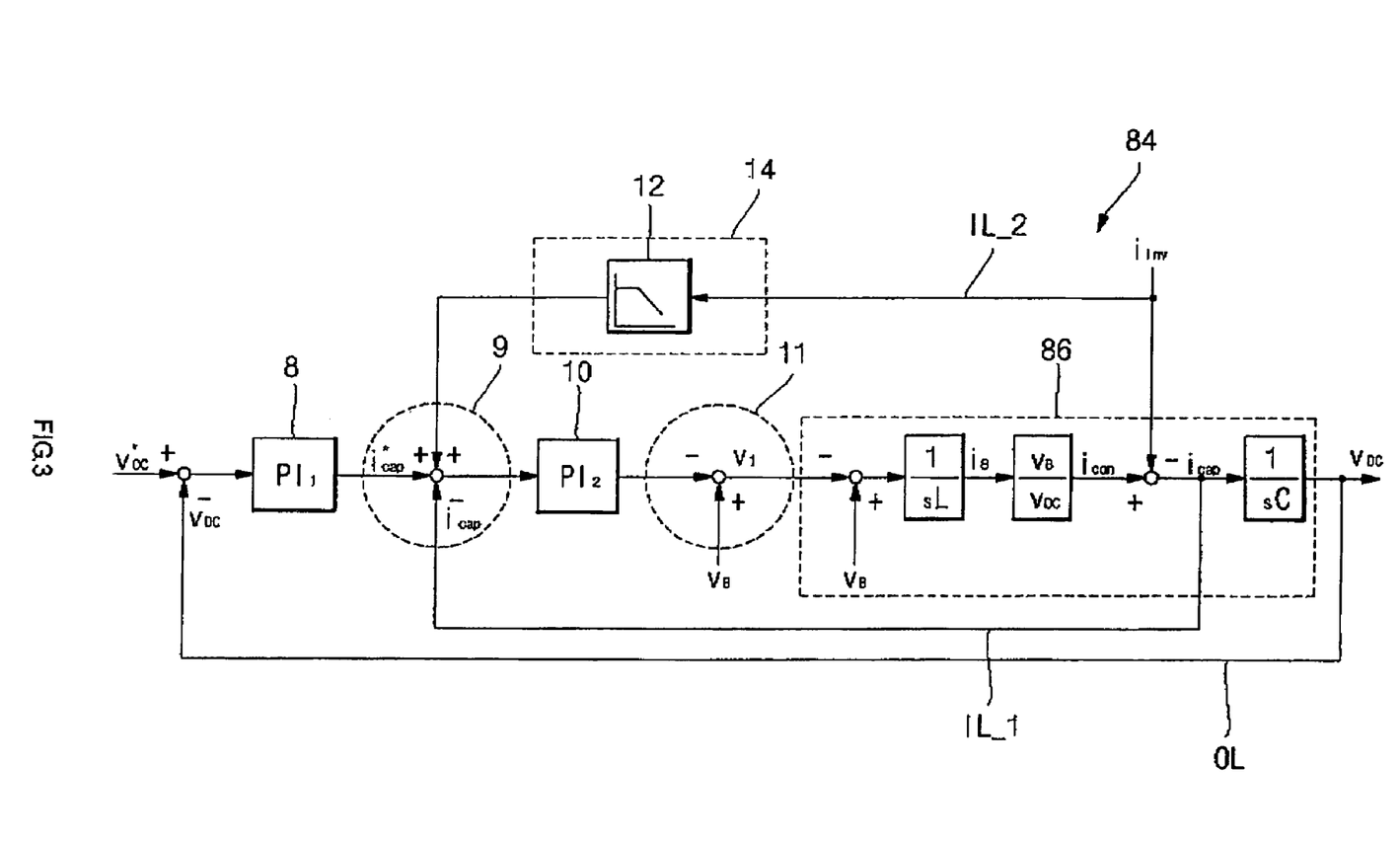
FIG. 3 is a circuit diagram illustrating the conventional method for controlling a voltage of a typical DC link.

FIG. 3 is a block diagram for explaining the conventional method for controlling a voltage of a typical DC link. Herein, the control block diagram is obtained through modeling operations performed by hardware or software within and around the control controller 84 using all kinds of equations.

An inner loop IL_1 in the block diagram is a control loop for the current $i_{con}$ of the DC/DC converter 4 as generally known and includes a proportional-integral controller 10. In addition, an outer loop (OL) is a control loop for a voltage $V_{dc}$ of the DC link 5 and includes a proportional-integral controller 8. In addition, another inner loop IL_2 is a control loop for the current $i_{inv}$ of the inverter 6 and includes a compensator 14. A low pass filter 12 may be installed and used in the compensator 14 for compensating the current $i_{inv}$ of the inverter 6. In FIG. 3, "L" and "C" included in the converter 86 represent the coil 2 used in the DC/DC converter 4 and the capacitor 5a of the DC link 5, respectively.

Reference numeral 9 represents a current node receiving a capacitor current reference $i^*_{cap}$ and the capacitor current $i_{cap}$. Reference numeral 11 represents a voltage node receiving a battery voltage $V_B$ together with a voltage converted from a current through the proportional-integral controller 10.

Figure 4:
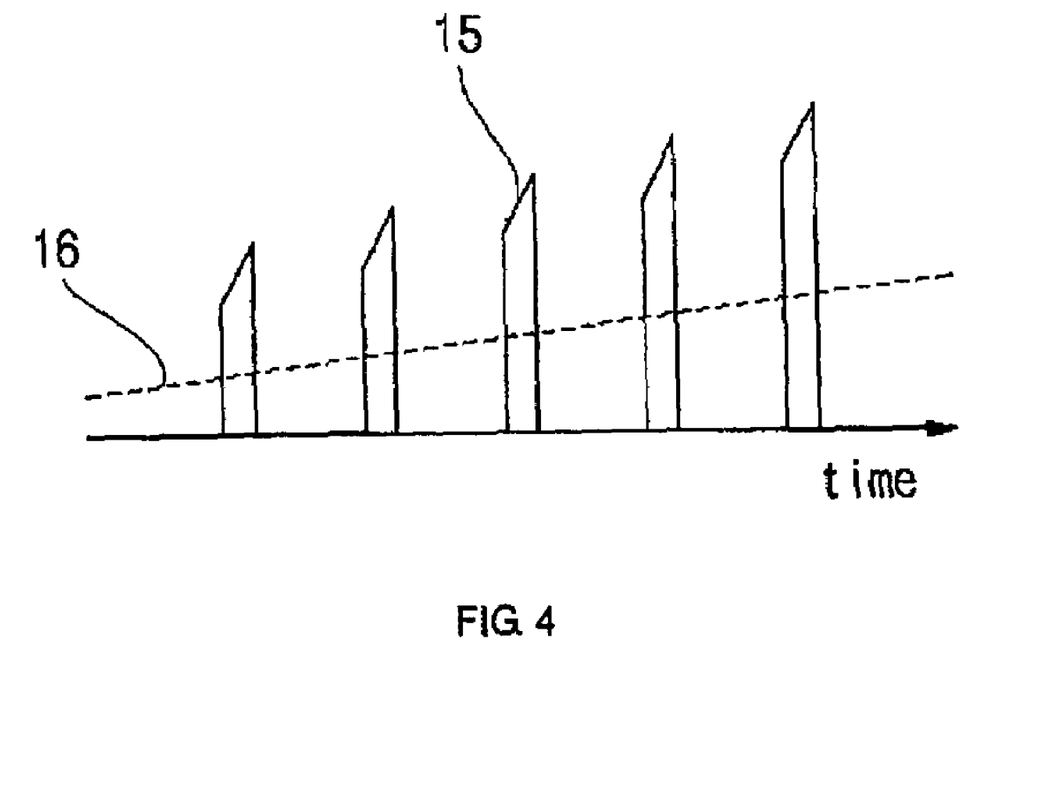
FIG. 4 is a graph illustrating a relationship between time and a pulse inverter current.

FIG. 4 is a graph illustrating a relationship between time and the pulse inverter current.

As shown in FIG. 3, the low pass filter 12 is used in the compensator 14 in order to compensate the inverter current $i_{inv}$. In other words, an average 16 of the inverter current shown in FIG. 4 is obtained using the low pass filter 12 and applied to the current node 9 receiving the capacitor current reference $i^*_{cap}$. Then, the applied compensation term is delivered to the converter 86 through the proportional-integral controller 10, so that the inverter current $i_{inv}$ is compensated. Accordingly, the voltage $V_{DC}$ of the DC link is constantly maintained.

Herein, the block diagram for controlling the voltage of the typical DC link shown in FIG. 3 will be described. The compensator 14 is used for compensating the inverter current $i_{inv}$, includes the low pass filter 12, and supplies the average 16 of the inverter current to the current node 9. It is natural that the compensation term supplied to the current node 9 is delivered to the converter 86 through the proportional-integral controller 10 in order to compensate the inverter current.

However, this proportional-integral controller 10 inevitably causes a phase delay due to a time delay of a signal. In addition, the low pass filter 12 used for finding the average 16 of the inverter current inevitably causes a phase delay due to a time delay of a signal.

Accordingly, it is difficult to compensate the instantly changed inverter current $i_{inv}$. In other words, the current $i_{con}$ of the DC/DC converter 4 does not fully follow the current $i_{inv}$ of the inverter 6 due to phase delays caused by the low pass filter 12 and the proportional-integral controller 10, respectively.

In addition, the mass storage capacitor 5a of the DC link 5 must be used due to the disadvantages described above such that the voltage fluctuation ratio is reduced. Accordingly, capacitor installation costs increase, and a wide capacitor installation space is required.

SUMMARY OF THE INVENTION

Accordingly, the present invention has been made to solve the above-mentioned problems occurring in the prior art, and an object of the present invention is to provide a method for controlling a voltage of a DC link for an electric vehicle, which can exactly compensate an inverter current without a phase delay, thereby remarkably reducing capacitance of the DC link.

To accomplish the above object of the present invention, there is provided a method for controlling a voltage of a DC link in a power system of a vehicle including a battery, a DC/DC converter, the DC link, an inverter, a motor, and a control part controlling the DC/DC converter and the inverter, the method including the steps of installing a compensator in a control loop of the control part such that a DC link current of the DC/DC converter follows a DC link current of the inverter, calculating a predetermined compensation term based on information of the motor inputted into the compensator, and applying the compensation term to a voltage node in the control loop of the control part in the compensator.

Herein, the information of the motor includes a current, a voltage, and a speed of the motor.

In addition, the compensation term is determined through Equation 1.

$$sLi_B = sL\frac{v_{DC}i_{inv}}{v_B} \qquad \text{Equation 1}$$

Herein, s, L, $i_B$, $v_B$, $v_{DC}$, and $i_{inv}$ denote a Laplacian differential operator, an inductance of a coil installed the DC/DC converter, a battery current, a battery voltage, a voltage of the DC link, and an average of the inverter current.

In addition, the average $i_{inv}$ of the inverter current is obtained through a voltage equation, a phase current equation, and a phase voltage equation of the motor.

In addition, if the compensation term $$sLi_B = sL\frac{v_{DC}i_{inv}}{v_B}$$

is input to the voltage node in the control loop of the control part, the inverter current $i_{inv}$ is equal to the current $i_{con}$ of the DC/DC converter through Equation 2, so that the capacitor current $i_{cap}$ of the DC link can be zero.

$$sL\frac{v_{DC}}{v_B}i_{inv} \times \frac{1}{sL} \times \frac{v_B}{v_{DC}} = i_{inv} = i_{con} \qquad \text{Equation 2}$$

In addition, since the battery voltage $v_B$ and the DC link voltage $v_{DC}$ are processed as constants in Equation 1, which represents the compensation term, a differential value of the $i_{inv}$ for a time must be found in order to calculate the compensation term.

The average $i_{inv}$ of the inverter current is given as $$i_{inv} = \frac{3}{2v_{DC}}(v_{ds}^r i_{ds}^r + v_{qs}^r i_{qs}^r)$$

by an equation relating to power. Herein, the $v_{ds}^r$, $i_{ds}^r$, $v_{qs}^r$, and $i_{qs}^r$ denote a d-phase stator voltage, a d-phase current, a q-phase stator voltage, and a q-phase current of a motor. If the average current $i_{inv}$ of the inverter is differentiated with respect to time, a differential value of the average current $i_{inv}$ is obtained through Equation 3.

$$\dot{i}_{inv} = \frac{3}{2v_{DC}}\left(\dot{v}_{ds}^r i_{ds}^r + v_{ds}^r \dot{i}_{ds}^r + \dot{v}_{qs}^r i_{qs}^r + v_{qs}^r \dot{i}_{qs}^r\right) \qquad \text{Equation 3}$$

In the differential value $$\dot{i}_{ds}^r$$

of the average of the inverter current, the values $$\dot{v}_{ds}^r \text{ and } \dot{v}_{qs}^r$$

approach values shown in Equation 4 and Equation 5 through an Euler method, respectively.

$$\dot{v}_{ds}^r = \frac{v_{ds}^r(kT_s) - v_{ds}^r((k-1)T_s)}{T_s} \qquad \text{Equation 4}$$

$$\dot{v}_{qs}^r = \frac{v_{qs}^r(kT_s) - v_{qs}^r((k-1)T_s)}{T_s} \qquad \text{Equation 5}$$

Herein, the $T_s$ and the K denote a PWM period (or, a sampling period) and an integer, respectively. In the differential value $$\dot{i}_{inv}$$

of the average current of the inverter, the values $$\dot{i}_{ds}^r \text{ and } \dot{i}_{qs}^r$$

are obtained through Equation 6 and Equation 7, which are a voltage equation for a permanent magnetic synchronization motor.

$$i_{ds}^r = -\frac{R_s}{L_d}i_{ds}^r + \frac{L_q}{L_d}\omega_r i_{qs}^r + \frac{v_{ds}^r}{L_d} \qquad \text{Equation 6}$$

$$i_{qs}^r = -\frac{R_s}{L_q}i_{qs}^r - \frac{L_d}{L_q}\omega_r i_{ds}^r + \frac{v_{qs}^r}{L_q} - \frac{\omega_r}{L_q}\phi_m. \qquad \text{Equation 7}$$

Herein, the $L_d$, $L_q$, $R_s$, $w_r$ and $\phi_m$ denote a d-phase inductance, a q-phase inductance, a stator resistance, a rotator speed, and a rotator magnetic flux of a motor, respectively. The d-phase current $i_{ds}^r$ of the synchronization motor is controlled as zero at a rated speed.

Equations 4 to 7 are substituted for Equation 3, so that the compensator term $$sLi_B = sL\frac{v_{DC}i_{inv}}{v_B}$$

is calculated as shown in Equation 8.

$$L\frac{v_{DC}}{v_B}si_{inv} = \frac{3L}{2v_B}\begin{bmatrix}\frac{L_d}{L_q}\omega_r v_{ds}^r(kT_s) + \frac{1}{T_s}\{v_{qs}^r(kT_s) - \\ v_{qs}^r((k-1)T_s)\} - \frac{R_s}{L_q}v_{qs}^r(kT_s)\end{bmatrix}i_{qs}^r(kT_s) + \\ \frac{3L}{2v_B}\begin{bmatrix}\frac{v_{ds}^r(kT_s)^2}{L_d} + \frac{v_{qs}^r(kT_s)^2}{L_q} - \frac{\omega_r\phi_m}{L_q}v_{qs}^r(kT_s)\end{bmatrix} \qquad \text{Equation 8}$$

In other words, if the compensation term calculated through Equation 8 is applied to a voltage node in the control loop of the control part, the inverter current $i_{inv}$ may be compensated.

As described above, the method for controlling a voltage of a DC link for an electric vehicle according to the present invention does not allow a low pass filter and a proportional-integral controller employed for the method for controlling a voltage of the typical DC link, thereby preventing a phase delay due to a time delay.

In addition, according to the present invention, a current icon a DC/DC converter fully follows an inverter current $i_{inv}$, so that a current $i_{cap}$ of a capacitor of a DC link becomes zero. Therefore, it is possible to reduce greatly capacitance of the DC link as compared with the method for controlling a voltage of the typical DC link. Accordingly, it is possible to reduce capacitor installation costs, a capacitor volume, and a capacitor weight.

In addition, according to the present invention, since an average inverter current is obtained using a phase voltage and a phase current applied to a motor and a voltage equation of the motor instead of using a hall sensor and a low pass filter employed for the conventional technique, it is possible to omit the hall sensor for measuring a DC link current and the low pass filter differently from the conventional method. Accordingly, it is possible to reduce costs caused by the installation of the hall sensor and the low pass filter.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a preferred embodiment of the present invention will be described with reference to the accompanying drawings in such a manner that those skilled in the art (e.g., a field for controlling a voltage of a DC link among power systems of an electric vehicle or a hybrid vehicle) can easily realize the present invention. In the following description and drawings, the same reference numerals are used to designate the same or similar components, and so repetition of the description on the same or similar components will be omitted.

Hereinafter, brief description about the spirit of the present invention will be given prior to the detailed description of the present invention. According to the present invention, in an electric vehicle, or a hybrid vehicle, a control part is designed in such a manner that a DC link current of a DC/DC converter fully follows a DC link current of an inverter, based on the fact that, if a DC link current of the DC/DC converter is equal to a DC link current of the inverter in a power system including the DC/DC converter and the inverter, a current flowing toward a capacitor of a DC link becomes zero (0), so that a voltage fluctuation ratio of the DC link does not exist even though a DC link capacitor having low capacitance is installed.

In order to realize the control part, a compensator must be installed in a current control loop of the converter controller, and a frequency response must be quickly achieved. For this reason, the conventional compensation method employing the low pass filter is not efficiency. According to the present invention, a notional differentiator is realized based on variables such as a current, a voltage, and a speed of a motor, and a result for the compensation term is applied to a voltage node instead of a current node in a control loop of a converter controller, thereby suggesting a compensation method having a speedy response. Thus, it is possible to actually reduce capacitance of a DC link.

A method for controlling a voltage of a DC link for an electric vehicle or a hybrid vehicle according to the present invention is realized in a vehicle power system including a battery 1, a DC/DC converter 4, a DC link 5, an inverter 6, a motor 7, and a control part 80 for controlling the DC/DC converter 4 and the inverter 6. Since the circuit structure of the vehicle power system realized through hardware described above is shown in a schematic view of FIG. 1 and is identical to that of the conventional vehicle power system, description about the circuit structure of the vehicle power system will be omitted in order to avoid redundancy.

Figure 5:
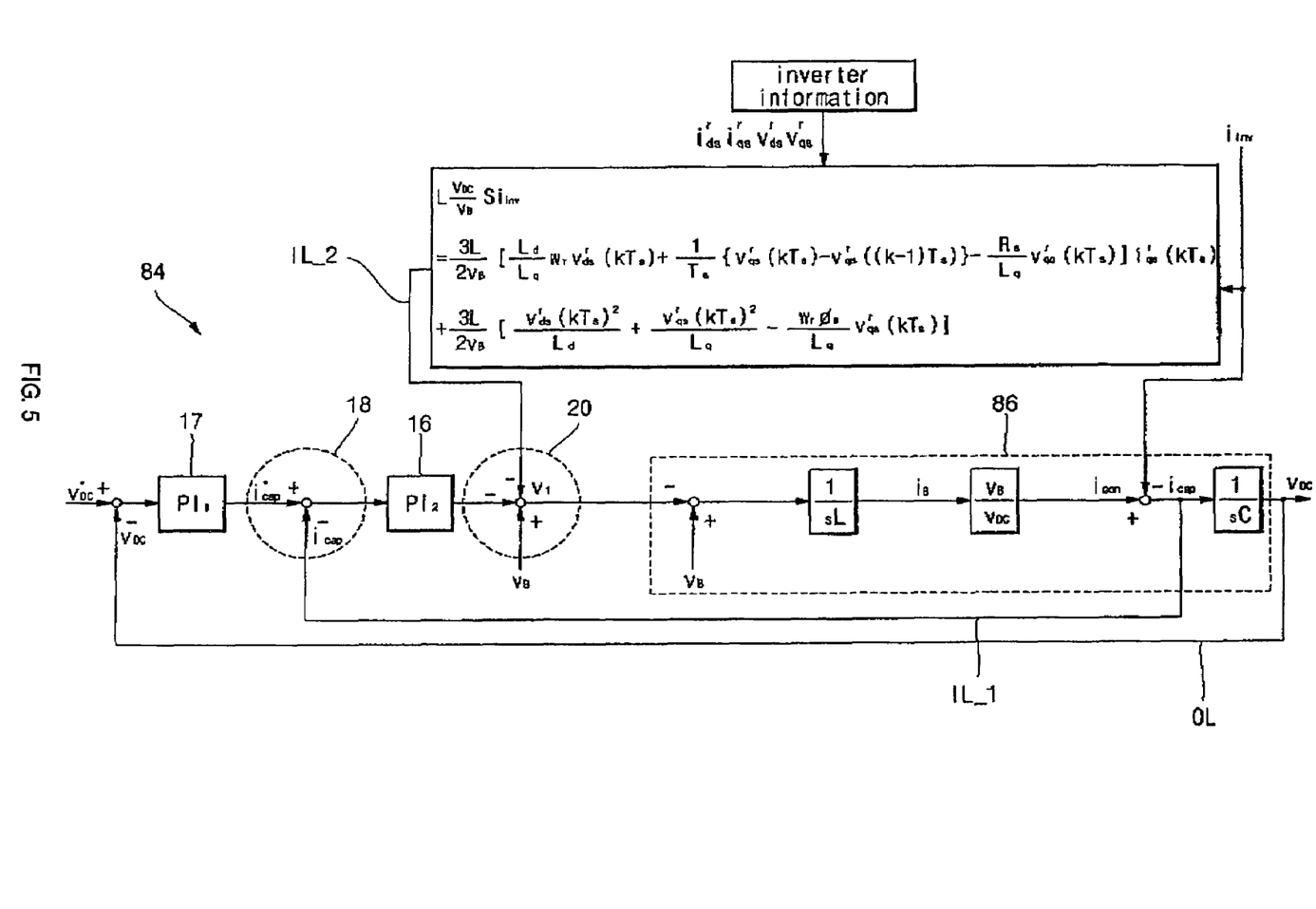
FIG. 5 is a circuit diagram illustrating a method for controlling a voltage of a DC link according to the present invention.

Sequentially, FIG. 5 is a block diagram for explaining the method for controlling a voltage of a DC link according to the present invention.

As shown in FIG. 5, the block diagram relating to the method for controlling a voltage of a DC link according to the present invention is similar to the block diagram shown in FIG. 3. Accordingly, hereinafter, the method for controlling the voltage of a DC link will be described based on a difference between the block diagram shown in FIG. 5 and the block diagram shown in FIG. 3. In addition, it is natural that those skilled in the art recognize that the method for controlling the voltage of the DC link can be realized through hardware or software in or around a converter controller.

An inner loop IL_1 in the block diagram is a control loop for the current $i_{con}$ of the DC/DC converter 4 as shown in FIG. 5 and includes a proportional-integral controller 16 similarly to the conventional technique. In addition, an outer loop (OL) is a control loop for a voltage $V_{dc}$ of the DC link 5 and includes a proportional-integral controller 17 similarly to the conventional technique. In addition, another inner loop IL_2 is a control loop for the current $i_{inv}$ of the inverter 6 and includes a compensator 21 newly introduced according to the present invention.

Reference numeral 18 represents a current node receiving a capacitor current reference $i^*_{cap}$ and a capacitor current $i_{cap}$. Reference numeral 20 represents a voltage node receiving a battery voltage $V_B$ and a compensation term while receiving a voltage converted from a current through the proportional-integral controller 16.

As described above, conventionally, the compensation term is supplied to the current node 18, so that the compensation term passes through the proportional-integral controller 16. Thus, a phase delay is caused. However, according to the present invention, the compensation term generated by the compensator 21 is directly supplied to the voltage node 20 instead of the current node 18 as shown in FIG. 5 so that the phase delay caused by the proportional-integral controller 16 can be avoided.

In FIG. 5, the compensator 21 is expressed as a schematic block diagram. The difference between the voltage $v_B$ of the battery 1 supplied to the voltage node 20 and the compensation term generated from the compensator 21 becomes a voltage $v_1$. Accordingly, since the value of the compensation term becomes a voltage of both ports of the coil 2 in the DC/DC converter 4, a differential value for a current $i_B$ of the battery 1 is required. However, if there is no loss of the DC/DC converter 4, the compensation term may be obtained through Equation 1.

$$sLi_B = sL\frac{v_{DC}i_{inv}}{v_B} \quad \text{Equation 1}$$

Herein, s, L, $i_B$, $V_B$, $v_{DC}$, and $i_{inv}$ denote a Laplacian differential operator, an inductance of the coil 2, the current of the battery 1, the voltage of the battery 1, the voltage of the DC link 5, and an average of the inverter current flowing toward the inverter 6, respectively.

Accordingly, the compensator 21 requires the differential value $i^*_{inv}$ of the inverter current. However, the inverter current $i_{inv}$ has a typical pulse type as shown in FIG. 4. Accordingly, the average value of the inverter current $i_{inv}$ is calculated in order to make the inverter current $i_{inv}$ into a differential form. If the conventional low pass filter is used as shown in FIG. 3, a phase delay is caused, so that the performance of the converter controller 84 is degraded. Therefore, according to the present invention, the average value of the inverter current $i_{inv}$ is calculated using a phase current and a phase voltage of a motor and a voltage equation of the motor instead of a low pass filter.

In addition, if the compensation term $$sL\frac{v_{DC}i_{inv}}{v_B}$$

is supplied to the voltage node 20 shown in FIG. 5, the compensation term is input to the converter 86 and processed through Equation 2.

$$sL\frac{v_{DC}}{v_B}i_{inv} \times \frac{1}{sL} \times \frac{v_B}{v_{DC}} = i_{inv} = i_{con} \quad \text{Equation 2}$$

In other words, since the current $i_{con}$ of the DC/DC converter 4 fully follows the current $i_{inv}$ of the inverter 6, the current $i_{cap}$ of the capacitor 5a in the DC link 5 becomes zero.

The calculation of the compensation term from the compensator 21 shown in FIG. 5 using an Interior Permanent Magnet (IPM) motor will be described below.

The average current $i_{inv}$ of the inverter 6 may be obtained using information about a phase current and a phase voltage of the IPM motor. The average current $i_{inv}$ of the inverter 6 is obtained as $$i_{inv} = \frac{3}{2v_{DC}}(v^r_{ds}i^r_{ds} + v^r_{qs}i^r_{qs}).$$

Herein, $v^r_{ds}$, $i^r_{ds}$, $v^r_{qs}$, and $i^r_{qs}$ denote a d-phase stator voltage, a d-phase current, a q-phase stator voltage, and a q-phase current. When the average current $i_{inv}$ of the inverter is differentiated with respect to time, a differential value of the average current $i_{inv}$ is obtained through Equation 3.

$$\dot{i}_{inv} = \frac{3}{2v_{DC}}\left(\dot{v}^r_{ds}i^r_{ds} + v^r_{ds}\dot{i}^r_{ds} + \dot{v}^r_{qs}i^r_{qs} + v^r_{qs}\dot{i}^r_{qs}\right) \quad \text{Equation 3}$$

In Equation 3 representing the differential value $\dot{i}^r_{ds}$ of the average current of the inverter, the values $\dot{v}^r_{ds}$ and $\dot{v}^r_{qs}$ approach values shown in Equation 4 and Equation 5 through an Euler method, respectively.

$$\dot{v}^r_{ds} = \frac{v^r_{ds}(kT_s) - v^r_{ds}((k-1)T_s)}{T_s} \quad \text{Equation 4}$$

$$\dot{v}^r_{qs} = \frac{v^r_{qs}(kT_s) - v^r_{qs}((k-1)T_s)}{T_s} \quad \text{Equation 5}$$

Herein, the $T_s$ and the K denote a PWM period (or, a sampling period) and an integer, respectively. In Equation 3 representing the differential value $\dot{i}_{inv}$ of the average current of the inverter, the values $\dot{i}^r_{ds}$ and $\dot{i}^r_{qs}$ are obtained through Equation 6 and Equation 7, which are voltage equations for a permanent magnetic synchronization motor.

$$\dot{i}_{ds}^r = -\frac{R_s}{L_d} i_{ds}^r + \frac{L_q}{L_d} \omega_r i_{qs}^r + \frac{v_{ds}^r}{L_d} \quad \text{Equation 6}$$

$$\dot{i}_{qs}^r = -\frac{R_s}{L_q} i_{qs}^r - \frac{L_d}{L_q} \omega_r i_{ds}^r + \frac{v_{qs}^r}{L_q} - \frac{\omega_r}{L_q} \phi_m \quad \text{Equation 7}$$

Herein, $L_d$, $L_q$, $R_s$ $w_r$ and $\phi_m$ denote a d-phase inductance, a q-phase inductance, a stator resistance, a rotator speed, and a rotator magnetic flux of a motor, respectively. The d-phase current $i_{ds}^r$ of the synchronization motor is controlled as zero at a rated speed.

Equations 4 to 7 are substituted for Equation 3, so that the compensator term $$sLi_B = sL\frac{v_{DC}i_{inv}}{v_B}$$

is calculated as shown in Equation 8.

$$L\frac{v_{DC}}{v_B}si_{inv} = \frac{3L}{2v_B}\begin{bmatrix} \frac{L_d}{L_q}\omega_r v_{ds}^r(kT_s) + \frac{1}{T_s}\{v_{qs}^r(kT_s) - \\ v_{qs}^r((k-1)T_s)\} - \frac{R_s}{L_q}v_{qs}^r(kT_s) \end{bmatrix} i_{qs}^r(kT_s) + \quad \text{Equation 8}$$

$$\frac{3L}{2v_B}\left[\frac{v_{ds}^r(kT_s)^2}{L_d} + \frac{v_{qs}^r(kT_s)^2}{L_q} \frac{\omega_r\phi_m}{L_q}v_{qs}^r(kT_s)\right]$$

In other words, if the compensation term calculated through Equation 8 is applied to a voltage node in the control loop of the control part, the inverter current $i_{inv}$ may be compensated.

As described above, according to the present invention, the compensator 21 is used for compensating the inverter current $i_{inv}$ recognized as disturbance. The compensation term calculated in the compensator 21 is supplied to the voltage node 20 in order to prevent a phase delay caused by a proportional-integral controller through the conventional method for controlling a voltage of a typical DC link. In addition, differently from the conventional technique, a differential value for the average of the inverter current required when the compensation term is calculated is obtained using a phase voltage and a phase current applied to the motor 7 and a voltage equation of the motor. In other words, it is possible to avoid a time delay caused by a low pass filter through the conventional method for controlling a voltage of the typical DC link. Thus, differently from the conventional method for controlling a voltage of the typical DC link, since it is possible to quickly compensate the inverter current, it is possible to reduce capacitance of a DC link.

As described above, the method for controlling a voltage of a DC link for an electric vehicle or a hybrid vehicle according to the present invention can prevent phase delays caused by a low pass filter and a proportional-integral controller through the conventional method for controlling a voltage of the typical DC link.

In addition, according to the present invention, a current $i_{con}$ of the DC/DC converter fully follows an inverter current $i_{inv}$, so that a current $i_{cap}$ of the capacitor of the DC link becomes zero. Therefore, it is possible to more largely reduce capacitance of the DC link as compared with the conventional method for controlling a voltage of the typical DC link. Accordingly, it is natural that it is possible to reduce capacitor installation costs, a capacitor volume, and a capacitor weight.

In addition, according to the present invention, since an average of the inverter current is obtained using a phase voltage and a phase current applied to a motor and a voltage equation of the motor, it is unnecessary to install a hall sensor and a low pass filter employed for the conventional technique. Therefore, it is possible to reduce costs caused by the installation of the hall sensor and the low pass filter.

The method for controlling a voltage of a DC link for an electric vehicle according to the present invention described above represents just one embodiment, and it will be understood by those skilled in the art that various changes in form and details may be made therein without departing from the spirit and scope of the invention. Consequently, the scope of the invention should not be limited to the embodiment, but should be defined by the appended claims and equivalents thereof.

The invention claimed is:

1. A method for controlling a voltage of a DC link in a power system of a vehicle including a battery, a DC/DC converter, the DC link, an inverter, a motor, and a control part controlling the DC/DC converter and the inverter, the method comprising:

installing a compensator in a control loop of the control part such that a DC link current of the DC/DC converter follows a DC link current of the inverter;

calculating a compensation term based on information of the motor inputted into the compensator; and applying the compensation term to a voltage node in the control loop of the control part.

2. The method as claimed in claim 1, wherein the information about the motor includes a current, a voltage, and a speed of the motor.

3. The method as claimed in claim 1, wherein the compensation term is determined through an equation, $$sLi_B = sL\frac{v_{DC}i_{inv}}{v_B},$$

wherein s, L, $i_B$, $v_B$, $v_{DC}$, and $i_{inv}$ denote a Laplacian differential operator, an inductance of a coil installed the DC/DC converter, a battery current, a battery voltage, a voltage of the DC link, and an average of the inverter current.

4. The method as claimed in claim 3, wherein the average $i_{inv}$ of the inverter current is obtained through a voltage equation, a phase current equation, and a phase voltage equation of the motor.

5. The method as claimed in claim 3, wherein, when the motor is a permanent magnetic synchronization motor, the equation, $$sLi_B = sL\frac{v_{DC}i_{inv}}{v_B},$$

is identical to an equation, $$L\frac{v_{DC}}{v_B}si_{inv} = \frac{3L}{2v_B}\begin{bmatrix}\frac{L_d}{L_q}\omega_r v^r_{ds}(kT_s) + \frac{1}{T_s}\{v^r_{qs}(kT_s) - \\ v^r_{qs}((k-1)T_s)\} - \frac{R_s}{L_q}v^r_{qs}(kT_s)\end{bmatrix}i^r_{qs}(kT_s) + \\ \frac{3L}{2v_B}\left[\frac{v^r_{ds}(kT_s)^2}{L_d} + \frac{v^r_{qs}(kT_s)^2}{L_q}\frac{\omega_r\phi_m}{L_q}v^r_{qs}(kT_s)\right],$$

wherein the $L_d$, $L_q$, $R_s$ $w_r$ and $\phi_m$ denote a d-phase inductance, a q-phase inductance, a stator resistance, a rotator speed, and a rotator magnetic flux of the motor, respectively, and the $T_s$ and the K denote a PWM period (or, a sampling period) and an integer, respectively.

6. The method as claimed in claim 3, wherein the compensation term $$\left(sLi_B = sL\frac{v_{DC}i_{inv}}{v_B}\right)$$

is subtracted at the voltage node in the control loop of the control part, so that the average of the inverter current $i_{inv}$ is compensated.

7. A power system for a vehicle, comprising:
a battery;
a DC/DC converter coupled to the battery;
a motor;
an inverter coupled to the motor;
a DC link interposed between the DC/DC converter and the inverter; and
a control part for controlling a voltage of the DC link, the control part including a control loop that includes a compensator to generate a compensation term such that a DC link current of the DC/DC converter follows a DC link current of the inverter,
wherein the compensator receives motor information as an input and determines the compensation term based on the motor information, and
wherein the motor information includes a current, a voltage, and a speed of the motor.

8. The system of claim 7, wherein the compensation term is supplied to a voltage node in the control loop of the control part instead of being supplied to a current node in the control loop.

9. A power system for a vehicle, comprising:
a battery;
a DC/DC converter coupled to the battery;
a motor;
an inverter coupled to the motor;
a DC link interposed between the DC/DC converter and the inverter; and
a control part for controlling a voltage of the DC link, the control part including a control loop that includes a compensator to generate a compensation term such that a DC link current of the DC/DC converter follows a DC link current of the inverter,
wherein the compensation term is determined through an equation, $$sLi_B = sL\frac{v_{DC}i_{inv}}{v_B},$$

wherein s, L, $i_B$, $v_B$, $v_{DC}$, and $i_{inv}$ denote a Laplacian differential operator, an inductance of a coil installed the DC/DC converter, a battery current, a battery voltage, a voltage of the DC link, and an inverter current.

10. The system of claim 9, wherein the inverter current is obtained through a voltage equation, a phase current equation, and a phase voltage equation of the motor.

11. The system of claim 9, wherein, when the motor is a permanent magnetic synchronization motor, the equation, $$sLi_B = sL\frac{v_{DC}i_{inv}}{v_B},$$

is identical to an equation, $$L\frac{v_{DC}}{v_B}si_{inv} = \\ \frac{3L}{2v_B}\left[\frac{L_d}{L_q}\omega_r v^r_{ds}(kT_s) + \frac{1}{T_s}\{v^r_{qs}(kT_S) - v^r_{qs}((k-1)T_s)\} - \frac{R_s}{L_q}v^r_{qs}(kT_s)\right]i^r_{qs}(kT_s) + \\ \frac{3L}{2v_B}\left[\frac{v^r_{ds}(kT_s)^2}{L_d} + \frac{v^r_{qs}(kT_s)^2}{L_q}\frac{\omega_r\phi_m}{L_q}v^r_{qs}(kT_s)\right],$$

wherein the $L_d$, $L_q$, $R_s$ $w_r$ and $\phi_m$ denote a d-phase inductance, a q-phase inductance, a stator resistance, a rotator speed, and a rotator magnetic flux of the motor, respectively, and the $T_s$ and the K denote a PWM period and an integer, respectively.

12. The system of claim 9, wherein the compensation term is supplied to a voltage node in the control loop of the control part instead of being supplied to a current node in the control loop.

* * * * *

UNITED STATES PATENT AND TRADEMARK OFFICE
CERTIFICATE OF CORRECTION

PATENT NO. : 7,528,566 B2  
APPLICATION NO. : 11/300161  
DATED : May 5, 2009  
INVENTOR(S) : Hong Seok Song et al.

Page 1 of 1

It is certified that error appears in the above-identified patent and that said Letters Patent is hereby corrected as shown below:

IN THE TITLE PAGE (30) Foreign Application Priority Data

Change "Nov. 17, 1920 (KR) ..... 2005-0110370"

to --Nov. 17, 2005 (KR) ..... 10-2005-0110370--

Signed and Sealed this
Twenty-second Day of February, 2011

David J. Kappos
*Director of the United States Patent and Trademark Office*